Figure 1:
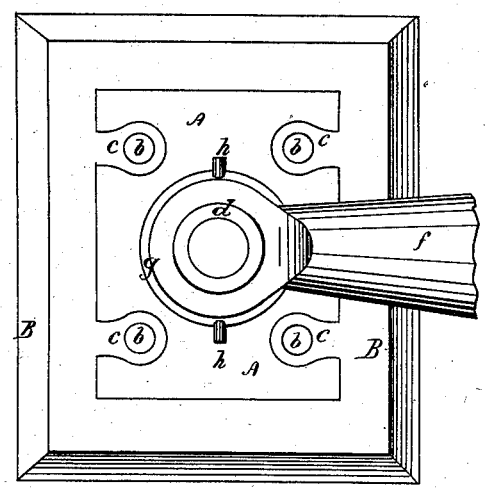
Figure 2:
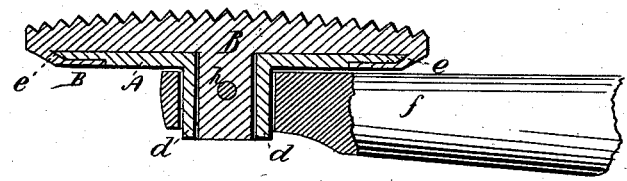
Figure 3:
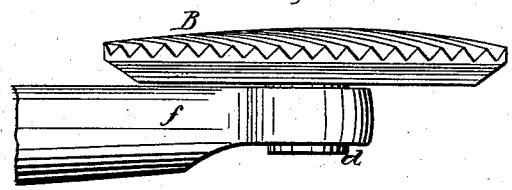

G. A. KEENE & F. A. SAWYER.
Carriage-Steps.

No. 154,990.  Patented Sept. 15, 1874.

Witnesses.  Inventor.

UNITED STATES PATENT OFFICE.

GEORGE A. KEENE, OF LYNN, AND FRANCIS A. SAWYER, OF BOSTON, MASS.

IMPROVEMENT IN CARRIAGE-STEPS.

Specification forming part of Letters Patent No. 154,990, dated September 15, 1874; application filed August 18, 1873.

To all whom it may concern:

Be it known that we, GEORGE AUGUSTUS KEENE, of Lynn, Massachusetts, and FRANCIS A. SAWYER, 2d, of Boston, Massachusetts, have invented an Improvement in Rubber Carriage-Steps, of which the following is a specification:

This is an improvement on the invention described in Letters Patent, dated June 11, 1867, numbered 65,754, issued to Geo. A. Keene, for improvement in india-rubber tread for carriage-steps.

The improvement consists of providing the metal plate with a lip projecting from the upper edge of the plate and a standard, either hollow or not, though a hollow one is preferred, jutting from the under side of the plate, and fitting into a hole in an unfinished shank, and secured to it by means of a pin passing through the shank and standard. The plate is also made with four holes, with channels or grooves of about half the thickness of the plate extending to its edge. The plate, lip, and standard are formed from one piece of metal.

The advantage of this construction is, that the step may be detached from the shank, which may be welded to a shank or shaped into any desired form, design, or curvature, to be attached to a carriage without injuring the rubber. The rubber is vulcanized over the top of the plate and surrounds the lip, the rubber on the bottom or under side being flush with the bottom of the plate, and while vulcanizing is pressed into the channels or grooves through the holes in the plate, and molded, by heat and pressure, to the surface rubber, thus riveting or knitting, as it were, the rubber to the plate. The holes in the plate may also be of use in case it is necessary to rivet to the step in the ordinary manner.

The surface of the step is formed or molded into parallel grooves and ridges running diagonally across the step from edge to edge of the projecting rubber lip, for the purpose of facilitating the escape of water or dirt from the step. The under side of the rubber lip is beveled to give the step a light and neat appearance.

We do not confine ourselves to this especial form of surface, but mold it to any required design, with the view to the escape of water, or of any sediment which may be deposited thereon.

Like letters indicate like parts in the drawings.

A is the metallic plate, provided with holes $b$, channels $c$, standard $d$, having a pin-hole through it, and projecting lip $e$, recessed at the lower side. $f$ is the unfinished or incomplete shank, with a knob formed on the end $g$, with a hole in it to receive the standard $d$, and provided with holes to correspond with those in the standard. $h$ is the pin fastening the step to the shank. B is the rubber vulcanized over plate A, surrounding lip $e$, and made flush with the bottom of the plate, and filling channels $c$ and holes $b$.

We claim and desire to secure by Letters Patent—

1. The plate A, provided with standard $d$, the shank $f$, having perforated knob $g$, to receive the standard, and fastened thereto by the pin $h$, all combined as and for the purpose set forth.

2. The plate A, having holes $b$ and channels $c$, combined with the vulcanizable rubber cover B, locked through the holes $b$, and united by heat and pressure in the vulcanizing process, substantially as described.

GEO. A. KEENE.
FRANCIS A. SAWYER, 2D.

Witnesses:
THOS. WM. CLARKE,
F. F. RAYMOND.